April 28, 1925.

J. Q. ROBERTS 1,535,857

TIRE RACK BRACE

Filed Aug. 22, 1923

Inventor
John Q. Roberts
by Wilkinson & Giusta
Attorneys

Patented Apr. 28, 1925.

1,535,857

UNITED STATES PATENT OFFICE.

JOHN QUINCE ROBERTS, OF MEMPHIS, TENNESSEE.

TIRE-RACK BRACE.

Application filed August 22, 1923. Serial No. 658,801.

*To all whom it may concern:*

Be it known that I, JOHN Q. ROBERTS, a citizen of the United States, residing at Memphis, in the county of Shelby and State of Tennessee, have invented certain new and useful Improvements in Tire-Rack Braces; and I do hereby declare the following to be a full, clear, and exact description of the invention, such as will enable others skilled in the art to which it appertains to make and use the same.

The present invention relates to improvements in Ford tire rack braces in which provision is made for adequately sustaining the spare tire rack on the rear of a Ford or other automobile.

At the present time considerable difficulty is experienced in sustaining the rear tire rack owing to the rather inadequate manner in which it is initially supported. When the weight of the spare tire is put upon the rack and the added strains due to road travel, the rack is bound to sag and finally to fall and become loose from its fastenings.

The invention aims to provide an additional support or brace for the tire rack connected at a point, namely the lower central part of the rack, where the brace will perform its function most effectively and whereby the tire rack will be additionally supported thereby taking a part of the strain off the side supporting arms.

An object of the invention is to provide for economy in the provision of this brace and its ready mounting upon existing parts of the Ford automobile.

With the foregoing and other objects in view, the invention will be more fully described hereinafter, and will be more particularly pointed out in the claim appended hereto.

Figure 1:
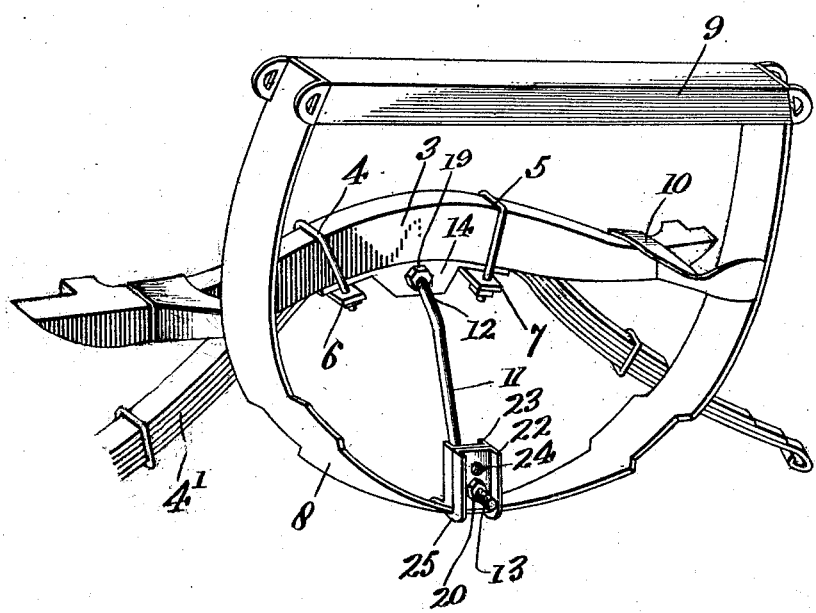
Figure 2:
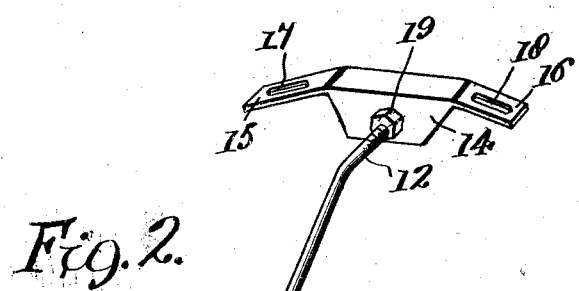

In the drawings, wherein like symbols refer to like or corresponding parts throughout the several views, Figure 1 is a fragmentary perspective view of portions of the rear of a Ford automobile showing the tire with the improved brace connected therewith, and Figure 2 is a perspective view of the brace detached.

Referring more particularly to the drawings 3 designates the transverse rear channel bar of the frame and 4' is the transverse rear spring which fits up beneath the upwardly arched central portion of the channel bar 3, the spring 4' being also arched upwardly at its central part and the channel of the bar 3 being directed downwardly.

Shackles or U-bolts 4 and 5 are secured upon opposite sides of the central portion of the upwardly bowed channel bar 3 for the purpose of binding the spring in place, these U bolts having plates 6 and 7 secured beneath the open lower portion of the channel and passing across the open mouth of the channel.

The tire rack or carrier is indicated at 8 and consists of the usual circular frame with a flat top bar 9 extending substantially horizontally and forming substantially a chord subtending the arc which is removed from the upper portion of the circular frame or rack. The demountable rim with the spare tire is received on its rack in the usual way and may be held in place by passing a chain about it through which a lock is secured.

Now this rack 8 is generally supported by side arms 10, these arms being secured to the rack 8 about midway the height thereof and bolted or otherwise secured to the rear frame member 3 or other parts of the frame. The arms 10 are generally substantially in alinement with the side rails of the frame and they may extend for some distance along these side rails and be secured thereto and in any event the fastenings and the area of the support is found inadequate and it will be noted that there is no support for the lower portion of the rack.

This lower portion therefore sags and the arms 10 become broken or loosed from their fastenings by reasons of the shocks and jars incident to travel.

According to the invention a brace arm or rod 11 is connected to the lower portion of the rack and to the nearest point of support upon the frame which is found to be the channel bar 3. The brace rod 11 consists of an intermediate diagonally disposed portion having the angularly bent ends 12 and 13. The upper end 12 is secured as by threading or otherwise into a block 14, which is of a size and shape to fit beneath the intermediate portion of the spring 4 and against the under portion of the channel bar 3 and this block 14 is made as to size and shape in conformity to the position which it is to occupy. Moreover there are wings or extension lugs 15 and 16 projecting from the upper edges of the block 14 which wings or extensions diverge downwardly in order to further agree with the arched shape of the bar and with the spring. These wings serve to further hold the spring in place and they slip beneath the plates 6 and 7, being preferably provided with slots 17 and 18 for taking further securing means. A lock nut 19 may be used to secure the end 12 of the brace in the block 14.

The lower end 13 of the brace is threaded and provided with nuts 20 and 21 to bind upon opposite sides of the channel clamp members 22 and 23 which are provided with series of perforations 24 to receive the brace end 13 as shown in Figure 1. The channel members 22 and 23 are provided with claws 25 for grasping beneath the lower portion of the tire rack 8. The nuts 20 and 21 serve to hold the brace to the clamp members and further to hold the clamp members together upon the rack.

It will therefore be seen that the brace 11 extends downwardly and directly between the rear frame portion of the vehicle and the lower central part of the rack so that the brace uniformly serves both sides of the tire rack and in conjunction with the arms 10 prevents sagging of the rack. The clamp members 22 and 23 and the block 14 provide for attaching the brace to existing constructions or in other words the device forms an attachment which may be sold at accessory shops and secured to the machines without requiring any change in construction.

It is obvious that various changes and modifications may be made in the details of construction and design of the above specifically described embodiment of this invention without departing from the spirit thereof, such changes and modifications being restricted only by the scope of the following claim.

What is claimed is:—

In combination with a vehicle having a tire rack, a pair of channel clamps having claws adapted to grasp the tire rack said clamp having perforations therein, a rod having a lower angular threaded end adapted to be selectively engaged in the perforations and having nuts on opposite sides of the clamp members for securing the rod to the clamp members and the clamp members together, a block secured to the upper angled end of said rod and adapted to fit beneath the arched channel bar of the frame and having slotted diverging wings extending from the upper side edges of the block, a spring fitted within the channel bar and partially held in place by said slotted wings, and U-shape bolts having plates for securing said wings to the frame member.

JOHN QUINCE ROBERTS.